United States Patent
Robbins et al.

(10) Patent No.: US 10,888,877 B2
(45) Date of Patent: *Jan. 12, 2021

(54) SEPARATION OF MINERALS BY SPECIFIC GRAVITY

(71) Applicant: Jody G. Robbins, Phoenix, AZ (US)

(72) Inventors: Jody G. Robbins, Phoenix, AZ (US); Joseph Richard Wantulok, Phoenix, AZ (US)

(73) Assignee: Jody G. Robbins, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/552,861

(22) Filed: Aug. 27, 2019

(65) Prior Publication Data

US 2019/0388906 A1 Dec. 26, 2019

Related U.S. Application Data

(63) Continuation of application No. 16/374,669, filed on Apr. 3, 2019.

(Continued)

(51) Int. Cl.
| | |
|---|---|
| *B04B 3/06* | (2006.01) |
| *B01D 21/26* | (2006.01) |
| *B04B 11/06* | (2006.01) |
| *B03B 5/32* | (2006.01) |
| *B03B 5/44* | (2006.01) |

(52) U.S. Cl.
CPC .............. *B04B 3/06* (2013.01); *B01D 21/262* (2013.01); *B03B 5/32* (2013.01); *B03B 5/442* (2013.01); *B04B 11/06* (2013.01)

(58) Field of Classification Search
CPC .. B04B 3/06; B04B 5/10; B04B 11/06; B03B 1/00; B03B 1/04; B03B 5/32; B03B 5/442; B01D 21/262
See application file for complete search history.

(56) References Cited

U.S. PATENT DOCUMENTS

| 2,071,260 A | 2/1937 | Holden |
| 3,076,547 A | 2/1963 | Bodine, Jr. |
(Continued)

FOREIGN PATENT DOCUMENTS

WO  WO 95/27551 A1  10/1995

OTHER PUBLICATIONS

"10-15 Ton/Hr Fine Gold Concentrator," product description available at http://www.911metallurgist.com/equipment/recover-gold-without-chemicals/, printed Apr. 2, 2019, 10 pages.

(Continued)

*Primary Examiner* — Charles A Fox
*Assistant Examiner* — Kalyanavenkateshware Kumar
(74) *Attorney, Agent, or Firm* — Knobbe, Martens, Olson & Bear, LLP

(57) ABSTRACT

A centrifuge for separating minerals by specific gravity is disclosed. The centrifuge rotates to circulate slurry across a collection region and to subject slurry in the collection region to centripetal forces that facilitate stratification within the collection region by the specific gravity of the constituent minerals of the slurry. Energy, such as acoustic energy, is coupled with the collection region and enhances the stratification by specific gravity within the collection region.

23 Claims, 5 Drawing Sheets

Related U.S. Application Data

(60) Provisional application No. 62/652,494, filed on Apr. 4, 2018.

(56) References Cited

U.S. PATENT DOCUMENTS

| | | | | |
|---|---|---|---|---|
| 3,327,401 | A | * | 6/1967 | Stamos ................ B04B 3/00 34/279 |
| 3,957,650 | A | | 5/1976 | Petrushkin et al. |
| 4,401,437 | A | | 8/1983 | Poetschke et al. |
| 4,523,682 | A | | 6/1985 | Barmatz et al. |
| 4,529,506 | A | * | 7/1985 | Smit .................... B03B 1/00 209/13 |
| 4,556,467 | A | | 12/1985 | Kuhn et al. |
| 4,799,920 | A | | 1/1989 | Mozley |
| 4,824,431 | A | | 4/1989 | McAlister |
| 5,562,823 | A | * | 10/1996 | Reeves ............. B04B 5/0414 210/243 |
| 5,577,669 | A | | 11/1996 | Vujnovic |
| 9,302,270 | B2 | | 4/2016 | Rothman et al. |
| 2003/0056584 | A1 | | 3/2003 | Park |
| 2012/0145633 | A1 | | 6/2012 | Polizzotti et al. |
| 2013/0252796 | A1 | | 9/2013 | Von Stetten et al. |
| 2017/0173597 | A1 | * | 6/2017 | Feraud ................. B04B 1/14 |

OTHER PUBLICATIONS

"Centrifugal Separators for Industrial Applications," Gruppo Pieralisi brochure, 8 pages, available at http://www.pierallsi.com/media/files/143_114_centrifugal_separators.pdf (2018).

"Centrifugal Ultrasonic Reactor for Separation," Hielscher brochure, https://www.hielscher.com/centrifugal-ultrasonic-reactor-for-separation.htm, printed Mar. 14, 2018, 2 pages.

Bakx, Kyle, "New titanium industry could grow out of oilsands waste," CBC News, posted Mar. 21, 2018, http://www.cbc.ca/news/business/titanium-oisands-cnrl-titaniumcorp-1.4584513, printed Mar. 23, 2018, 3 pages.

Falconer, Andrew, "Gravity separation: Old techniques/new methods," Physical Separation in Science and Engineering, 2003, vol. 12, No. 11, pp. 31-48.

Greguss, P., "Some effects of combined ultrasonic fields and centrifugal forces," Ultrasonics, Jan. 1971, vol. 9, Issue 1, pp. 10-13.

Marinelli, J. et al., "Panel Discussion: Mixing, Sampling & Segregation," International Powder & Bulk Solids Conference and Exhibition, Apr. 24-26, 2018, Donald E. Stephens Convention Center, Rosemont, IL, Session date: Thursday, Apr. 26, 2018, 9:00am-10:00am, title page.

Marinelli, J. et al., "Volumetric & Gravimetric Feeder Design to Ensure Reliable Flow," International Powder & Bulk Solids Conference and Exhibition, Apr. 24-26, 2018, Donald E. Stephens Convention Center, Rosemont, IL, Session date: Wednesday, Apr. 25, 2018, 3:15pm-4:45pm, title page.

Tate, Karl, "International Space Station's Cooling System: How It Works (Infographic)," Space.com, May 10, 2013, https://www.space.com/21059-space-station-cooling-system-explained-infographic.html, printed Apr. 2, 2019, 5 pages.

Zhu, Z. et al., "Ultrasound-assisted extraction, centrifugation and ultrafiltration: Multistage process for polyphenol recovery from purple sweet potatoes," Molecules, 2016, vol. 21, 1584, 13 pages.

International Search Report and Written Opinion for International Application No. PCT/US2019/025660, dated Oct. 24, 2019 in 20 pages.

* cited by examiner

SEPARATION OF MINERALS BY SPECIFIC GRAVITY

CROSS-REFERENCE TO RELATED APPLICATIONS

This application is a continuation of U.S. patent application Ser. No. 16/374,669, filed Apr. 3, 2019, which claims priority to U.S. Patent Prov. App. 62/652,494, which is titled "SEPARATION OF MINERALS BY SPECIFIC GRAVITY" and was filed on Apr. 4, 2018. The above-recited applications are incorporated herein by reference in their entirety.

FIELD

The present disclosure relates to systems and methods for separating or concentrating material of higher specific gravity from material of lower specific gravity, such as heavy metals from a fluid or slurry.

BACKGROUND

It is often desirable to extract particular materials, such as heavy metals, from their surrounding materials, but the desired materials can be present in low concentrations relative to the surrounding materials and therefore difficult to extract. For example, mining operations generate streams of mixed materials, from which desired materials are concentrated and extracted. Mining operations, however, generally fail to extract all of the desired materials, due to the limitations of technologies for concentrating and extracting specific materials from the mixed material streams produced by mines. Many historic mines also utilized inferior extraction technologies, thus leaving tailings containing significant quantities of valuable materials. Additionally, historic mines produced tailings with a large quantity of materials, such as rare earth metals, that were not be extracted during operation of the mine, due to technological or economic factors (e.g., the cost of extracting such materials may have greater than the value of recoverable materials given the technology available at the time). Modern mining operations are also constantly seeking cheaper and more efficient technologies for recovering desired materials. Similarly, industrial processes can produce waste that includes harmful elements that should be extracted for environmental, regulatory or safety reasons.

The present disclosure relates to systems and methods for recovering low concentration target materials, such as heavy metals, from surrounding materials.

SUMMARY OF THE INVENTION

Various examples of methods and apparatus for recovering target materials from mixed materials are disclosed. Without limiting the scope of the claims, some prominent features of this disclosure will now be briefly described.

One aspect of the disclosed technology is a device for separating a first mineral of a first specific gravity from at least a second mineral of a second specific gravity that is lower than the first specific gravity. The device includes a centrifuge configured to rotate about an axis. At least one collection region is configured to be subject to centripetal acceleration when the centrifuge rotates about the axis. At least one energy injection module is coupled to the collection region and configured to provide oscillating energy into the collection region. The collection region and energy injection module are configured to stratify the first and second minerals.

In some embodiments, the energy injection module is configured to provide acoustic energy into the collection region. The energy injection module can be configured to provide acoustic energy at a subsonic frequency. The energy injection module can be configured to provide acoustic energy at a plurality of frequencies simultaneously.

In some embodiments, the energy injection module is configured to provide oscillating pressure waves into the collection region. The energy injection module can be configured to provide oscillating energy into the collection region such that the oscillating energy propagates into the collection region along a direction substantially parallel to the centripetal acceleration at the collection region.

In some embodiments, the device additionally includes a membrane between the collection region and the energy injection module.

In some embodiments, the centrifuge is configured to receive the first and second minerals in slurry. The centrifuge can also be configured to circulate the slurry across the collection region as the centrifuge rotates about the axis.

In some embodiments, the device additionally includes at least one spring that acts on the energy injection module and that counters at least part of the centripetal acceleration on the energy injection module.

In some embodiments, the device additionally includes at least one sensor that measures an amount of material present in the collection region. For example, the device can include at least one sensor that measures the mass of material collected in the collection region.

Another aspect of the disclosed technology is a method for separating a first mineral of a first specific gravity from at least a second mineral of a second specific gravity that is lower than the first specific gravity. The method includes obtaining a fluidized slurry containing the first and second minerals. The slurry is spun in a centrifuge such that the slurry is circulated within the centrifuge and across at least one collection region. At least a portion of slurry is received in the collection region, which is subjected to centripetal forces due to the rotation of the centrifuge about the axis. Energy waves are generated and injected into the collection region. The first and second minerals are stratified in the collection region.

In some embodiments, generating the energy waves comprises generating acoustic waves. For example, generating the acoustic waves can comprise generating subsonic waves. Generating the acoustic waves can also comprise generating acoustic waves at a plurality of frequencies simultaneous.

In some embodiments, generating the energy waves comprises generating pressure waves.

In some embodiments, generating the energy waves comprises generating at least one standing wave in the collection region.

In some embodiments, obtaining the fluidized slurry comprises grinding the first and second minerals such that the first and second minerals have a maximum particle size of 100 microns and adding a fluid to the first and second minerals.

In some embodiments, the method additionally includes, while the centrifuge is rotating, weighing material collected within the collection region.

In some embodiments, generating the energy waves comprises generating the energy waves with an energy injection module separated from the collection regions by a moveable membrane, and the method also includes, while the centrifuge is rotating, determining a weight of material collected within the collection region based on a measured deflection of the moveable membrane and based on a rate of rotation of the centrifuge.

Figure 1A:
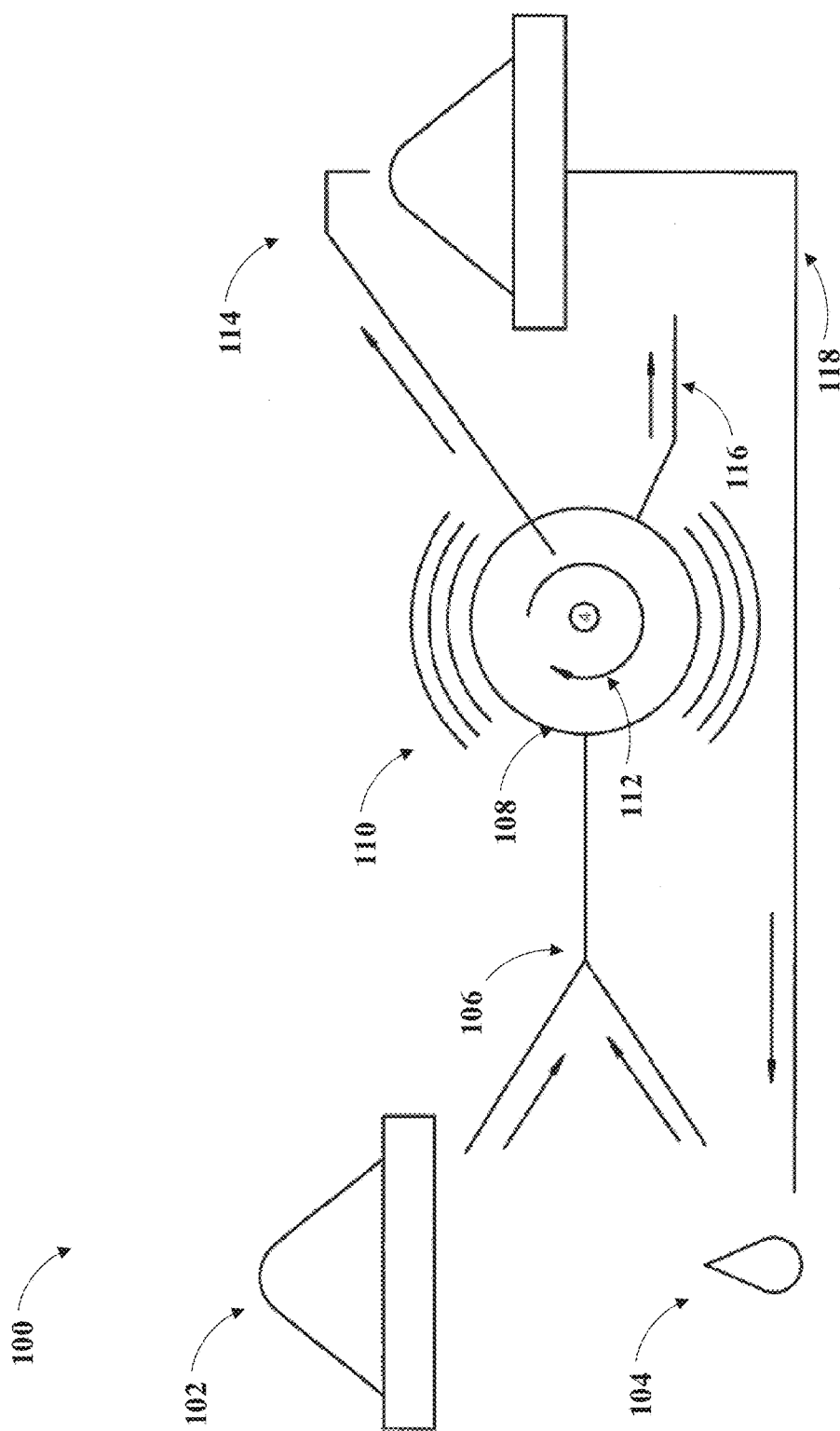
FIG. 1A schematically illustrates an example of a materials separation system.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Reference will now be made to the drawings, in which like reference numerals refer to like parts throughout. Unless indicated otherwise, the drawings are schematic not necessarily drawn to scale.

A system 100 for separating minerals by specific gravity with a centrifuge 108 is shown in FIG. 1A.

In FIG. 1A, a suitable feed source 102 is combined with a fluid 104 to form slurry 106. In some embodiments, the slurry can be fed into a centrifuge 108. In some embodiments, the slurry can be formed within the centrifuge from separate feeds of dry material (e.g., powder) and fluid (e.g., liquid). In some embodiments, the feed source 102 may be tailings from a mine, industrial waste or other materials that contain minerals of different specific gravity. In some embodiments, the feed source 102 may include materials from volcanic vents on the ocean floor, alluvial fans from rivers, materials from asteroids or other celestial bodies, or any other source of materials containing minerals of different specific gravity.

In at least some embodiments, centrifuge 108 may be operated in a reduced or zero gravity environment such as in orbit around a celestial body or on the surface of a natural or artificial object other than Earth. If desired, centrifuge 108 may be modified for operation in low gravity such as by sealing an otherwise open section (such as a top) of the centrifuge 108. As another example, the centrifuge 108 may be integrated into a mobile processing unit (MPU) capable of transporting the centrifuge 108 to a desirable location on a natural or artificial object other than Earth. The MPU may be capable of collecting and pre-processing material (e.g., the MPU may include crushers and/or rotary sieve devices to pre-process regolith or other source materials to a desired grain size). Additionally, the MPU and/or centrifuge 108 may include augers or paddles to assist in the movement of materials through the centrifuge 108 and related components (e.g., input hoppers, output hoppers, etc.), which may be particularly beneficial in low gravity environments where gravity cannot be relied upon for moving materials. In some embodiments, the MPU may include internal and/or external storage for storing valuable materials such as concentrate 116. As a particular example, the MPU may include mechanisms for robotically removing saturated collection cells (such as collection region 144 and collection regions 210a, 210b) from the centrifuge and storing the saturated collection cells for later collection.

In various embodiments, centrifuge 108 may be operated in environments of varying temperatures (e.g., environments on Earth, in space, or on the surface of objects other than Earth that are subject to extreme cold, extreme heat, or both). If desired, centrifuge 108 may be modified for operation in environments of different temperatures such as extreme cold or extreme heat. As one example, a cold-tolerant fluid such as ammonia may be utilized as fluid 104 when centrifuge 108 is operated in cold environments on Earth or in space. As another example, cold-tolerant materials (e.g., materials that are not excessively brittle and retain sufficient structure strength at low temperatures) may be used in forming the structure of centrifuge 108. As yet another example, centrifuge 108 may include heating elements that heat centrifuge 108, fluid 104, slurry 106, and/or other components of centrifuge 108. In environments such as the Moon, mined materials such as regolith may be excessively hot at the surface and excessively cold below the surface. In such environments, centrifuge 108 may be fed with a selective mix of surface regolith and subsurface regolith to achieve a desired temperature of the working materials (e.g., such that feed source 102 is within a suitable temperature range).

If desired, alternatives to fluid 104 may be used as a medium for material being separated. In particular, fluid 104 may be replaced with a solid medium formed of balls or grains, which may have a larger size than the feed source 102 being separated by centrifuge 108 and such solid carrier medium could be recovered with a rotary sieve or other recovery mechanism. Solid medium alternatives to fluid 104 may be beneficial in overcoming fluid issues in severe temperatures and/or low pressure or vacuum conditions. Embodiments described herein are particularly well-suited to low or zero-gravity and cold environments typical of extraterrestrial applications and can operate without human intervention.

In some embodiments, the feed source 102 may include tailings or other similar materials that have been ground to a suitable particle size or to a suitable range of particle sizes. As an example, the feed source 102 may include materials that have been ground, or otherwise processed, such that the nominal maximum particle size in feed source 102 is a range of about 50 microns to 200 microns, for example, about 100±15 microns. In some embodiments, feed source 102 may be combined with a fluid 104 such as water or ammonia to form slurry 106 (e.g., fluidized slurry 106). Fluid 104 may include any suitable fluid and, if desired, may include chemicals that aid in stratification by specific weight within the centrifuge 108. As an example, the fluid 104 may include lubricants, surfactants, and other chemicals that facilitate or accelerate stratification by specific weight within the centrifuge 108. As another example, the fluid 104 may include anti-freeze additives that lower that freezing point of the fluid, which aid in preventing freezing of fluid 104 when centrifuge 108 is operating in cold environments, such as extraterrestrial environments. As noted above, in various embodiments, slurry 106 may be created inside centrifuge 108 by separately adding fluid 104 and feed source 102 into centrifuge 108.

Slurry 106 may be processed by the centrifuge 108 to produce concentrate 116 and tailings 114. As depicted in FIG. 1A, centrifuge 108 may spin (as indicated by arrow 112) to produce centripetal forces (e.g., centripetal acceleration) that are significantly higher than acceleration due to gravity. These centripetal forces may facilitate the separation of components of slurry 106 by the different specific weights of those components. In other words, minerals in slurry 106 having a greater specific weight may tend to "fall", while minerals in slurry 106 having a lower specific weight may tend to "rise," in an acceleration field (such as gravity or such as the radially directed field found in a centrifuge). By using a centrifuge that provides substantial centripetal forces, the separation of materials by specific weight can be accelerated.

In some embodiments, slurry 106 may be processed by multiple centrifuges 108 coupled together in series, where each centrifuge processes the reject material, or tailings 114, from a prior centrifuge. In such embodiments, multiple stages of centrifuges coupled together in series may be configured to separate a variety of materials out of slurry 106. As an example, an initial stage formed of one or more centrifuges may separate out a first material of a first specific weight, a second stage formed of one or more additional centrifuges may receive the tailings from the initial stage and may separate out a second material of a second specific weight less than the first specific weight, a third stage formed of one or more additional centrifuges may receive the tailings from the second stage and may separate out a third material of a third specific weight less than the second specific weight, and so on for as many stages as desired. Such embodiments may allow processing of a spectrum of many materials from high to low specific weight from a particular feed source.

In some embodiments, multiple centrifuges 108 may be coupled together in parallel to increase processing speed and/or volume. In other embodiments, configurations of both serial and parallel couplings are provided. As an example, system 100 may include a first stage formed from one or more centrifuges 108 coupled together in parallel and the first stage may be coupled in series with at least a second stage formed from one or more centrifuges coupled together in parallel. In such an example, the first stage may separate out a first mineral of a relatively heavy specific weight, while the second stage may separate out a second mineral of a lower specific weight than the first mineral. In general, stages need not be formed from identical numbers of centrifuges coupled together in series. As an example, a first stage may be formed from a single centrifuge, while a second stage may be formed from two or more centrifuges coupled together in parallel. In general, references to a centrifuge in the present disclosure are not limited to a single centrifuge and instead encompass a single centrifuge and combinations of multiple centrifuges coupled together in series, parallel, or a combination of series and parallel connections.

As depicted by sound waves 110, centrifuge 108 may be assisted by coupling vibrations or oscillating energy to the fluid in the centrifuge 108. In embodiments, the energy may be in the acoustic range, and the centrifuge may be referred to as an acoustically-assisted centrifuge 108, though it will be understood that in some embodiments the desired energy may oscillate outside the acoustic range. As an example, centrifuge 108 may include one or more acoustic modules that provide acoustic energy 110 into the slurry 106 within the centrifuge 108. The energy 110 may, as an example, represent sub-sonic sound waves. As examples, energy 110 may range from 0.5 Hz to 9 Hz and may vary between 0.5 Hz to 9 Hz over time. As another example, energy 110 may vary between 0.5 Hz and 40 Hz over time.

Acoustic energy 110 may, in various embodiments, include oscillations at multiple frequencies provided simultaneously, sometimes referred to as polyphonic energy. For example, energy 110 may include energy of multiple acoustic frequencies. In some embodiments, different frequencies of energy 110 may create different desired effects. As an example, a first frequency (or set of frequencies) may be tuned to increase mobility of a first mineral, while a second frequency (or set of frequencies) may be tuned to increase mobility of a second mineral or a fluid component of the slurry in the centrifuge 108. As another example, a first frequency (or set of frequencies) may be provided to reduce friction or sticking between particles, while a second frequency (or set of frequencies) may be provided to push minerals of a lower specific weight than desired out of the collection regions.

If desired, acoustic energy 110 may include energy that cancels, minimizes, or reduces undesired ambient energy or energy created by a component of the system. As an example, there may be ambient acoustic energy or acoustic energy created by operation of the centrifuge 108 that slows the rate of stratification in the centrifuge, depending upon the materials of interest and the dimensions of the centrifuge. In such examples, acoustic energy 110 may include energy that cancels such undesirable acoustic energy.

In some embodiments, the frequency or frequencies of energy 110 may be configured to increase fluidization of components of slurry 106. In particular, acoustic energy 110 may help to reduce friction between components of slurry 106, thereby accelerating the separation of materials by specific weight under an acceleration force (such as the centripetal forces generated by centrifuge 108). In various embodiments, energy 110 may increase lubrication in the slurry 106 within the collection regions, may induce supercavitation within the collection regions, may create one or more standing waves within the collection regions.

If desired, centrifuge 108 may be assisted by something other than oscillating energy of the type depicted by sound waves 110. As an example, in some embodiments, system 100 may include an energy injection module that injects air or fluid into the centrifuge 108 and, in particular, that injects air or fluid into collection regions (such as regions 144 of FIG. 1B). Injecting air or fluid into the collection regions may help to disturb the sediment, reduce friction between components of slurry 106 and/or otherwise aid in stratification of materials by specific weight within the collection regions. In some embodiments, the injected air or fluid has a lower specific weight than the mineral being concentrated and may have the effect of washing minerals of lower specific weight out of the collection regions.

Figure 1B:
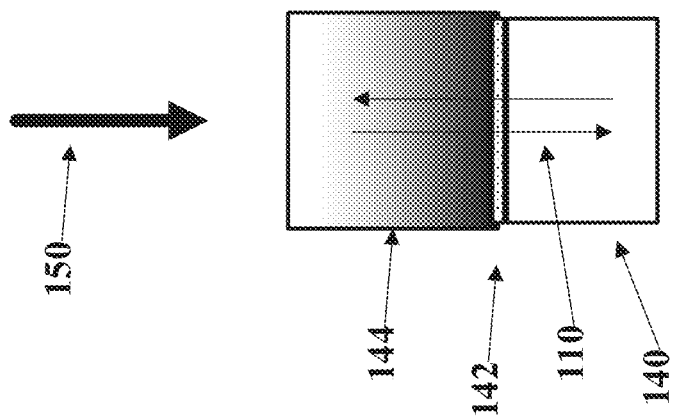
FIG. 1B schematically illustrates an example energy injection module and collection region for stratifying materials by specific weight.

FIG. 1B illustrates an example of an energy injection module 140 of the type that may generate energy 110 of FIG. 1A. The energy injection module 140 may be separated from a collection region 144 by a membrane 142. As shown in FIG. 1B, slurry within the collection region 144 may stratify by specific weight due to the centripetal forces 150 of the spinning centrifuge 108 and with the assistance of energy 110 from energy injection module 140. In particular, components of slurry 106 having the highest specific weight may tend to migrate towards the outside of centrifuge 108 (e.g., the direction of centripetal force 150 illustrated in FIG. 1B), while components having lower specific weights may migrate inwards. Energy injection module 140 may vibrate (e.g., in directions parallel to the centripetal forces 150 and at suitable frequencies, which may be in the subsonic range) and the vibrations of energy injection module 140 may be conveyed as energy 110 via membrane 142 into collection region 144. As an example, the energy injection module 140 may produce energy that propagates parallel to the direction of the centripetal force 150 illustrated in FIG. 1B). The energy 110 may reduce friction amongst the particles of the slurry 106, thereby increasing the speed of stratification according to specific weight within the collection region 144.

Membrane 142 may be formed from materials that facilitate coupling energy from module 140 into collection region 144. As examples, membrane 142 may be formed from Kevlar, graphene, steel, titanium, titanium nitride, rubber, synthetic rubber, metal, plastic, other suitable materials, or combinations of these and other suitable materials. In some embodiments, membrane 142 may be a flexible membrane.

Referring again to FIG. 1A, concentrate 116 may be produced by one or more centrifuges 108, which may be coupled together in series, in parallel, or in a configurations including parallel and serial combinations. In various embodiments, concentrate 116 may represent components of slurry 106 having the highest specific gravity. Similarly, tailings 114 may be produced by centrifuge 108 and may represent the components of slurry 106 having a lower specific gravity. While tailings is sometimes referred to as a waste product, in some embodiments the tailings 114 may be a desired product (e.g., such as examples in which concentrate 116 represents an undesired contaminant).

As shown by path 118, excess fluid may be extracted from tailings 114 and reused as in-feed fluid 104, thus cyclically treating the material to progressively extract further minerals.

Figure 2:
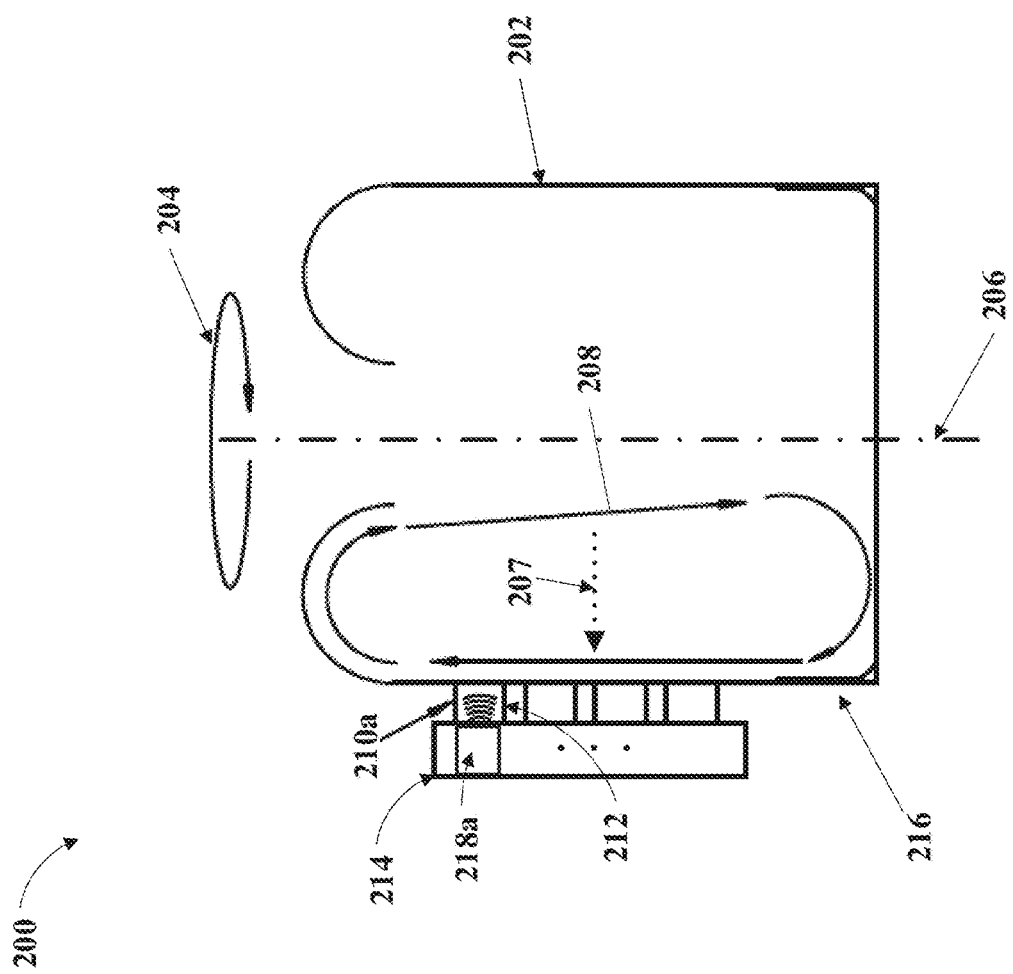
FIG. 2 shows a schematic cross-sectional side view of a centrifuge for separating materials by specific weight.

A cross-section side view of a centrifuge 200 is shown in FIG. 2. The centrifuge 200 of FIG. 2 may be an example of the centrifuge 108 discussed in connection with FIGS. 1A and 1B. As shown in FIG. 2, the centrifuge 200 may have sidewalls 202 for an inner chamber that rotate in direction 204 about axis 206, producing centripetal forces 207. The centripetal forces 207, which may be significantly larger than gravitational acceleration, may increase the speed of stratification by specific weight of constituents of the slurry processed by the centrifuge 200. The centrifuge 200 may rotate about axis 206 at a speed (e.g., revolutions per minute or RPM) sufficient to produce, in combination with the radius of the centrifuge 200, the desired magnitude of centripetal forces 207. As an example, the centrifuge 200 may rotate at approximately 500 RPM. Centrifuge 200 may be formed of suitable materials. If desired, the walls and interior components of centrifuge 200 may be coated with high-wear coatings such as titanium nitride, ceramics, metals, etc., which may help to prevent rapid abrasion from slurry 208. If desired, centrifuge 200 may include control circuitry that prevents operation of the centrifuge 200 unless one or more wear-items are replaced, repair, or otherwise refurbished after some number of operating hours, which may be predetermined or which may be determined based on observed operating conditions.

As shown in FIG. 2, slurry 208 may circulate within the centrifuge 200. In particular, the slurry 208 may be pressed against the sidewalls 202 by centripetal forces 207. The top of the sidewalls 202 may be curved inwards, such that the slurry 208 that migrates up the sidewalls is thrown back down to the bottom of the centrifuge. As a result, the slurry may circulate in the manner illustrated in FIG. 2. If desired, the centrifuge 200 may include a stator (e.g., a fixed element that does not rotate with the centrifuge or rotates as a slower speed) at the top of the sidewalls 202. Such a stator may direct momentum of slurry that reaches the top of the sidewalls 202 such that the slurry is directed back to the bottom of the centrifuge, thus improving circulation of the slurry 208 within the centrifuge. Such a stator may, in some embodiments, be curved to assist in directing slurry 208 downwards and inwards from the top of centrifuge at the sidewalls 202 towards the central bottom of centrifuge 200. Downward direction of the slurry by the stator can be useful both terrestrial and extraterrestrial (low or zero gravity) environments. In some embodiments, centrifuge 200 may be sealed. Additionally, centrifuge 200 may include mechanisms, such as valves and moveable gates, that actuate to facilitate the addition of slurry 208 and the removal of slurry and/or concentrate. A centrifuge 200 operated in a sealed configuration may be beneficial for operations in a reduced gravity environment.

The circulating slurry 208 may pass over outer chambers or collection regions including collection region 210a. As the slurry 208 passes over the collection regions such as region 210a, the particles having greater specific weights may become trapped within the collection regions. In at least some embodiments, the collection regions 210a may be removably coupled to the sidewalls 202 of the centrifuge 200.

FIG. 2 also illustrates a housing 214, which may include energy injection generators such as illustrated generator 218a that inject energy 212, which may be pressure waves, acoustic energy, or other forms of energy, into the collection regions such as region 210a. The housing 214 may, in at least some embodiments, be removably coupled to the centrifuge. As discussed in connection with FIGS. 1A and 1B, the energy injection generators such as generator 218a may enhance and accelerate stratification of minerals in the slurry 208 by specific weight within the collection regions. Additionally, the energy injection generators may help prevent the collection regions from clogging by encouraging mixing of the slurry inside the collection regions with the slurry passing by the collection regions. In particular, the energy injection generators may encourage the exchange of stratified minerals having lower specific weights and located at the "top" (e.g., radially inward in the orientation of the centripetal forces 207) of the collection regions with mixed slurry flowing by the collection regions. In this manner, minerals in the slurry 208 having the greatest specific weights can tend to collect or concentrate at the "bottom" of the collection regions (e.g., radially outward in the orientation of the centripetal forces 207).

In some embodiments, the centrifuge 200 may include a waste drain 216. In such embodiments, the waste drain 216 may be opened as the slurry 208 may be discharged from the centrifuge 200 when desired. As an example, after minerals having the highest specific weights are concentrated in the collection regions, the remaining slurry 208 may be practically devoid of such minerals and the waste drain 216 may be opened. If desired, the waste drain 216 may be opened while the centrifuge 200 is still spinning (e.g., with or without slowing the centrifuge 200 down from its typical operating speed). After draining waste slurry via the waste drain 216, fresh slurry 208 may be added to the centrifuge 200 for further processing.

Figure 3:
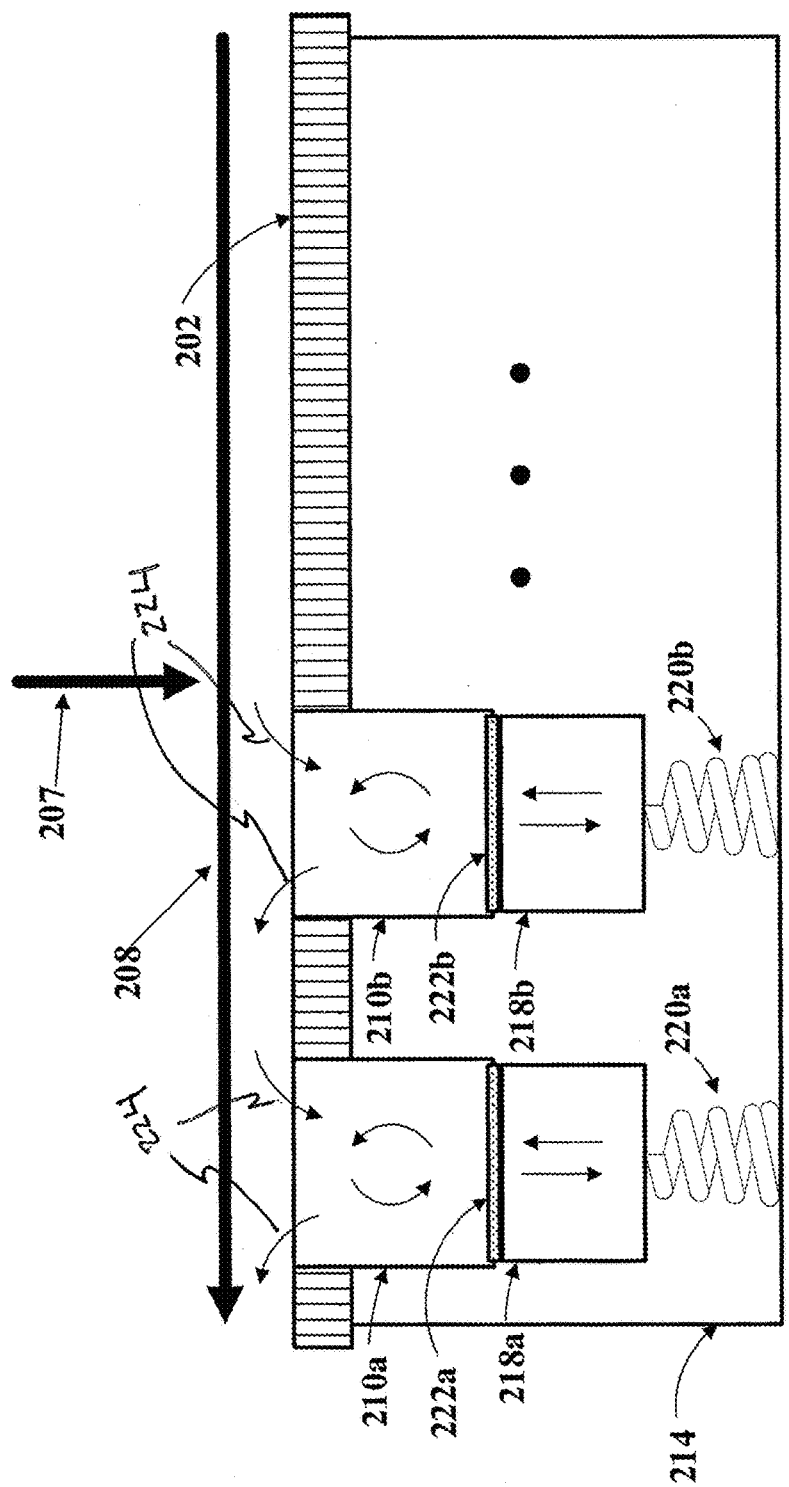
FIG. 3 is a close-up schematic diagram of radially-mounted energy injection modules and collection regions in the centrifuge of FIG. 2.

A close-up diagram of the energy injection modules 218 and collection regions 210 of FIG. 2 is shown in FIG. 3. As shown in FIG. 3, the slurry 208 may pass over collection regions 210a, 210b, etc. and centripetal forces 207 (from the spinning of centrifuge 200) may press the slurry 208 from the inner chamber defined by the sidewalls 202 into the outer chambers or collection regions, as indicated by flow paths 224.

As shown in FIG. 3, the housing 214 may contain one or more collection regions 210a, 210b, etc., each of which can be associated with an energy injection module 218a, 218b, etc. Moreover, the housing 214 may be removably coupled to the centrifuge sidewalls 202. As discussed in connection with FIGS. 1A, 1B, and 2, energy injection modules such as modules 218a, 218b may be separated from collection regions by membranes such as membranes 222a, 222b. The membranes separating energy injection modules from collection regions, such as membranes 222a, 222b may be formed from materials that facilitate coupling energy from module 140 into collection region 144. As examples, the membranes may be formed from Kevlar, graphene, steel, titanium, titanium nitride, rubber, synthetic rubber, metal, plastic, other suitable materials, or combinations of these and other suitable materials. In some embodiments, the membranes may be flexible membranes.

In at least some embodiments, the energy injection modules 218a, 218b, etc. may be held against the collection regions 210a, 210b, etc. by springs 220a, 220b, etc. The springs 220a, 220b may provide a counter force to centripetal forces 207, such that the energy injection modules 218a, 218b remain in communication with the collection regions 210a, 201b such that they can couple energy into the collection regions without having to overcome the centripetal forces 207. In at least some embodiments, the springs 220a, 220b may provide a variable spring force, which can be varied in relation to the rotation speed of centrifuge 200 and in relation to the mass of minerals in collection regions 210a, 210b. As an example, the spring force provided by springs 220a, 220b may be increased with increasing rotation speed of the centrifuge 200 and may be increased as minerals having higher specific weights collect in the collection regions. In some embodiments, springs 220a, 220b may be formed from air chambers and the spring force may be increased or decreased by pumping air into or out of the air chambers.

If desired, centrifuge 200 may include sensors that measure the mass of material within collection regions 210a, 210b. As one example, springs 220a, 220b may include sensors that detect how much force is imparted on the springs by the mass within the collection regions (which is subject to centripetal forces 207). The mass of material within collection regions 210a, 210b may be used to determine if the centrifuge is properly balanced, if the stiffness of a spring needs to be increased (e.g., by pumping more air into a suitable air chamber), or if a particular collection region is full or clogged. In at least some embodiments, centrifuge 200 may include control circuitry configured to use information from such sensors to balance the centrifuge (e.g., by selectively disabling one or more energy injection modules to reduce the rate of mass build-up in those modules), to determine when processing of the slurry is complete (e.g., when the desired materials having the greatest specific weights have been suitably concentrated in the collection regions), or for other purposes.

As shown in FIG. 3, the slurry 208 may stratify within the collection regions 210a, 210b according to specific weight, with the minerals with the heaviest specific weights accumulating at the "bottom" (e.g., the outside of centrifuge 200) of the collection regions. Additionally, minerals with lighter specific weights may escape the collection regions and allow fresh slurry to enter the collection regions. As a result, the minerals with the heaviest specific weights may accumulate in the portions of the collection regions more remote from the centrifuge axis over time.

Figure 4:
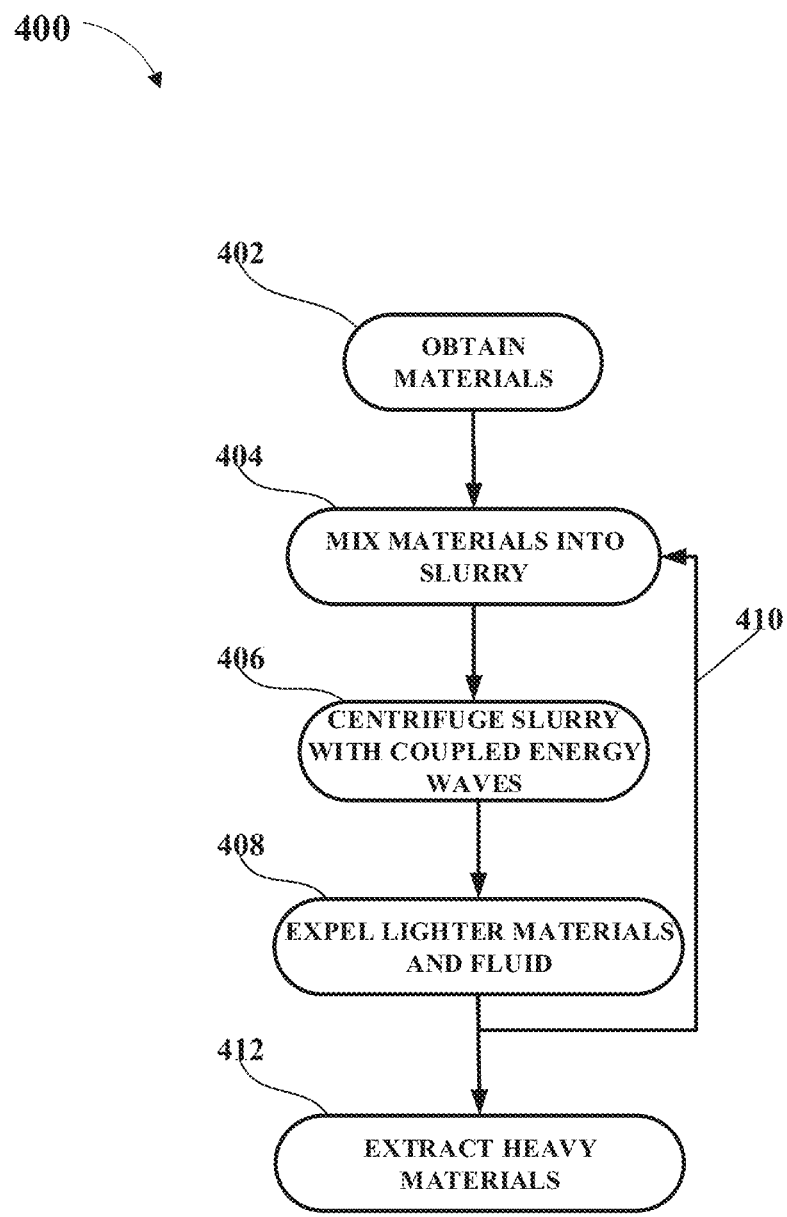
FIG. 4 is a process flow diagram of an example of a method for using a materials separation system.

FIG. 4 is a process flow diagram of an example method 400 for separating minerals by specific gravity using an centrifuge with energy coupled to it to enhance stratification. The method 400 may be performed, for example, by the centrifuge described herein.

At block 402, materials may be obtained for processing in the centrifuge. As discussed herein, the materials may be mine tailings or other material streams that include a mixture of minerals having different specific weights. Additionally, the materials may be ground, screened, or otherwise processed in preparation for separation in the centrifuge. As an example, the materials may be processed to have a suitable particle size.

At block 404, the materials may be mixed with suitable fluid into a slurry. In some embodiments, the slurry may be added to the centrifuge. In at least some embodiments, the centrifuge may be spinning during the addition of slurry. In other embodiments, the centrifuge may be spun up after introduction of slurry. In other embodiments, the slurry may be formed within the centrifuge by separate addition of dry material, such as powder, and fluid.

At block 406, the centrifuge may be spun and modules may be activated to introduce energy into collection regions of the centrifuge. As discussed with respect to FIGS. 1A-3, both the centripetal forces generated by the rotation of the centrifuge and the lubricating energy coupled to the collection regions (e.g., acoustic energy produced by energy injection modules, which may be acoustic modules) may enhance and expedite the concentration and stratification of minerals having high specific densities in the collection regions of the centrifuge. As examples, the energy injected by the energy injection module may increase lubrication between particles in the slurry, may reduce friction within the slurry, may create standing waves within the collection regions that reduce friction between particles in the slurry, and/or may induce super-cavitation that reduces friction between particles in the slurry.

At block 408, waste slurry may be removed or expelled from the centrifuge. In some embodiments, block 408 may be performed after sensors in the centrifuge determine that the collection regions are full, nearly full, filled to a desired capacity, or that the mass of the collection regions has stabilized (e.g., indicating that any higher specific weight minerals in the slurry are already contained within the collection regions and the circulating slurry should be discarded). As noted by arrow 410, additional slurry may be added to the centrifuge after expelling waste slurry in block 408. In other words, blocks 404, 406, and 408 may be repeated as desired. In some embodiments, blocks 404, 406, and 408 may be repeated until sensors in the centrifuge indicate that the collection regions are full or nearly full of material having high specific weight.

At block 412, heavy materials, or materials having a high specific weight, may be extracted from the centrifuge. In some embodiments, block 412 may involve stopping the centrifuge and physically removing and emptying the collection regions, which now contain concentrated high-specific-weight minerals.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The word "coupled," as generally used herein, refers to two or more elements that may be either directly coupled to each other, or coupled by way of one or more intermediate elements. Likewise, the word "connected," as generally used herein, refers to two or more elements that may be either directly connected, or connected by way of one or more intermediate elements. Additionally, the words "herein," "above," and words of similar import, when used in this application, shall refer to this application as a whole and not to any particular portions of this application. Where the context permits, words in the above Detailed Description using the singular or plural number may also include the plural or singular number respectively. Where the context permits, the word "or" in reference to a list of two or more items is intended to cover all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments.

While certain embodiments have been described, these embodiments have been presented by way of example, and are not intended to limit the scope of the disclosure. Indeed, the novel methods, apparatus, and systems described herein may be embodied in a variety of other forms. Furthermore, various omissions, substitutions and changes in the form of the methods, apparatus, and systems described herein may be made without departing from the spirit of the disclosure. For example, device components described herein may be deleted, moved, added, subdivided, combined, and/or modified. Each of these device components may be implemented in a variety of different ways. The accompanying claims and their equivalents are intended to cover any such forms or modifications as would fall within the scope and spirit of the disclosure.

The above description is intended to be illustrative and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A device for separating minerals by specific gravity, the device comprising:
    a centrifuge configured to rotate about an axis, the centrifuge comprising an inner chamber, a collection region comprising an outer chamber, and a flow path between the outer chamber and the inner chamber to convey a mineral-containing material from the inner chamber to the collection region;
    an energy injection module configured to couple to the collection region to provide oscillating energy into the collection region, wherein the centrifuge, the collection region and the energy injection module are configured to settle minerals out of the mineral-containing material and stratify the minerals by specific gravity; and
    wherein material collects in the collection region, wherein the material has a mass, and wherein the device further comprises at least one sensor that measures the mass of material collected in the collection region.

2. The device defined in claim 1, wherein the energy injection module is configured to provide acoustic energy into the collection region.

3. The device defined in claim 2, wherein the energy injection module is configured to provide acoustic energy at a plurality of frequencies simultaneously.

4. The device defined in claim 1, wherein the energy injection module is configured to provide oscillating energy into the collection region such that the oscillating energy propagates into the collection region along a direction substantially parallel to a direction of centripetal acceleration at the collection region.

5. The device defined in claim 1, further comprising a membrane between the collection region and the energy injection module.

6. The device defined in claim 1, wherein the centrifuge is configured to receive the mineral-containing material in a slurry.

7. The device defined in claim 1, wherein the centrifuge is configured to receive the mineral-containing material in a slurry and is configured to circulate the slurry across the collection region as the centrifuge rotates about the axis.

8. The device defined in claim 1, further comprising at least one spring that acts on the energy injection module and that counters at least part of a centripetal acceleration from rotation of the centrifuge.

9. The device defined in claim 1, further comprising at least one sensor that measures an amount of material present in the collection region.

10. The device defined in claim 1, wherein the centrifuge is configured to receive the mineral-containing material in a solid medium formed of balls.

11. A device for separating minerals by specific gravity, the device comprising:
    a centrifuge configured to rotate about an axis, the centrifuge comprising an inner chamber, a collection region comprising an outer chamber, and a flow path between the outer chamber and the inner chamber to convey a mineral-containing material from the inner chamber to the collection region; and
    an energy injection module configured to couple to the collection region to provide oscillating energy into the collection region, wherein the centrifuge, the collection region and the energy injection module are configured to settle minerals out of the mineral-containing material and stratify the minerals by specific gravity, wherein the energy injection module is configured to provide acoustic energy into the collection region at a subsonic frequency.

12. A method for separating minerals by specific gravity, the method comprising:
    obtaining a fluidized slurry containing at least two minerals having different specific gravities;
    supplying the fluidized slurry into an inner chamber of a centrifuge;

rotating the centrifuge containing the slurry about an axis such that the slurry is circulated within the centrifuge;

while rotating the centrifuge, weighing material collected within the collection region;

conveying at least a portion of the slurry from the inner chamber into an outer chamber of at least one collection region connected to the inner chamber;

generating energy waves and injecting the energy waves into the collection region; and stratifying the minerals in the collection region by specific gravity.

13. The method defined in claim 12, wherein generating the energy waves comprises generating acoustic waves.

14. The method defined in claim 13, wherein generating the acoustic waves comprises generating acoustic waves at a plurality of frequencies simultaneous.

15. The method defined in claim 12, wherein generating the energy waves comprises generating at least one standing wave in the collection region.

16. The method defined in claim 12, wherein obtaining the fluidized slurry comprises grinding the minerals such that the minerals have a maximum particle size of 50 microns and adding a fluid to the minerals.

17. The method defined in claim 12, wherein generating the energy waves comprises generating the energy waves with an energy injection module separated from the collection regions by a moveable membrane, and wherein weighing material collected within the collection region comprises:

determining a weight of material collected within the collection region based on a measured deflection of the moveable membrane and based on a rate of rotation of the centrifuge.

18. A method for separating minerals by specific gravity, the method comprising:

obtaining a fluidized slurry containing at least two minerals having different specific gravities;

supplying the fluidized slurry into an inner chamber of a centrifuge;

rotating the centrifuge containing the slurry about an axis such that the slurry is circulated within the centrifuge;

conveying at least a portion of the slurry from the inner chamber into an outer chamber of at least one collection region connected to the inner chamber;

generating energy waves and injecting the energy waves into the collection region, wherein generating the energy waves comprises generating acoustic energy waves, and wherein generating the acoustic waves comprises generating subsonic waves; and stratifying the minerals in the collection region by specific gravity.

19. A device for separating minerals by specific gravity, the device comprising:

a centrifuge comprising a collection region and an inner chamber connected to the collection region, the centrifuge configured to rotate about an axis and to convey a mineral-containing material from the inner chamber to an outer chamber of the collection region;

a fluid inlet for supplying the mineral-containing material to the inner chamber of the centrifuge; and an energy injection module configured to couple to the collection region to provide oscillating energy into the collection region, wherein the centrifuge, the collection region and the energy injection module are configured to settle minerals out of the mineral-containing material and stratify the minerals by specific gravity, and wherein the energy injection module is configured to provide acoustic energy into the collection region at a subsonic frequency.

20. The device defined in claim 19, wherein the energy injection module is configured to provide acoustic energy at a plurality of frequencies simultaneously.

21. The device defined in claim 19, wherein the energy injection module is configured to provide oscillating energy into the collection region such that the oscillating energy propagates into the collection region along a direction substantially parallel to a direction of centripetal acceleration at the collection region.

22. The device defined in claim 19, further comprising a membrane between the collection region and the energy injection module.

23. The device defined in claim 19, wherein the centrifuge is configured to receive the mineral-containing material in a slurry and is configured to circulate the slurry across the collection region as the centrifuge rotates about the axis.

\* \* \* \* \*